United States Patent [19]
Aoki et al.

[11] Patent Number: 6,151,954
[45] Date of Patent: Nov. 28, 2000

[54] DEVICE FOR DETECTING KNOCKING IN AN INTERNAL COMBUSTION ENGINE

[75] Inventors: Keiichiro Aoki, Susono; Yoichi Kurebayashi, Toyohashi, both of Japan

[73] Assignees: Toyota Jidosha Kabushiki Kaisha, Aichi-Ken; Denso Corporation, Aichi-Pref., both of Japan

[21] Appl. No.: 08/923,744

[22] Filed: Sep. 2, 1997

[30] Foreign Application Priority Data

Sep. 3, 1996 [JP] Japan ................................. 8-233006

[51] Int. Cl.⁷ ................................................. G01L 23/22
[52] U.S. Cl. .................... 73/35.08; 73/35.06; 324/378
[58] Field of Search ................. 73/35.01, 35.03, 73/35.04, 35.05, 35.06, 35.07, 35.08, 116, 117.2, 117.3; 123/425, 426, 435, 630; 324/378, 399; 701/99, 101, 102, 111

[56] References Cited

U.S. PATENT DOCUMENTS

| 4,467,634 | 8/1984 | Rohde et al. . |
| 4,565,087 | 1/1986 | Damson et al. . |
| 5,220,821 | 6/1993 | Moser et al. . |
| 5,337,716 | 8/1994 | Fukui et al. ............................. 123/425 |
| 5,343,844 | 9/1994 | Fukui et al. ............................. 123/481 |
| 5,483,818 | 1/1996 | Brandt et al. .......................... 73/35.01 |
| 5,563,332 | 10/1996 | Yasuda ................................... 73/35.08 |
| 5,675,072 | 10/1997 | Yasuda et al. ......................... 73/35.08 |

FOREIGN PATENT DOCUMENTS 6159129   6/1994   Japan .

OTHER PUBLICATIONS

Patent abstracts of Japan, vol. 010, No. 220 (p–482) Jul. 31, 1986 & JP 61 057830 A (NEC Home Electronics LTD), Mar. 24, 1986.
Patent Abstracts of Japan, vol. 018, No. 491 (M–1672), Sep. 13,1994 & JP 06 159129 A (Daihatsu Motor Co. Ltd.; others: 01), Jun. 7, 1994.

*Primary Examiner*—Hezron Williams
*Assistant Examiner*—Richard A. Moller
*Attorney, Agent, or Firm*—Kenyon & Kenyon

[57] ABSTRACT

A device for detecting knocking of an internal combustion engine which, even when spike noise is generated, does not erroneously detect it as knocking. An ionic current signal detected by an ionic current detecting unit 17 is separated into a knocking frequency component passing through a band-pass filter 32 and frequency components other than the knocking frequency component passing through a low-pass filter 321 and a high-pass filter 322. When the knocking frequency component is higher than a predetermined level, it is determined that the knocking is occurring. When the frequency component other than the knocking frequency component is higher than the predetermined level, it is regarded that the spike noise is generating, so that the generation of spike noise will not be erroneously determined as knocking.

32 Claims, 11 Drawing Sheets

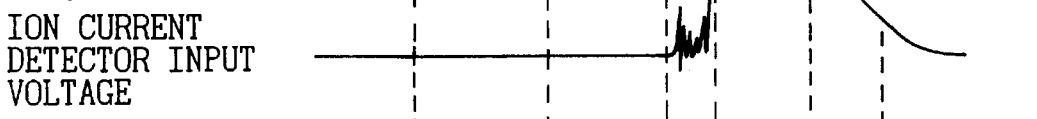
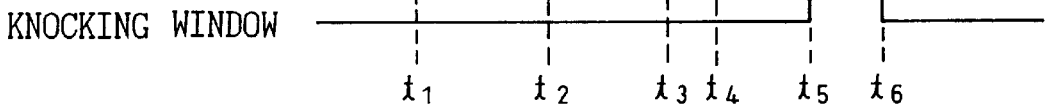

DEVICE FOR DETECTING KNOCKING IN AN INTERNAL COMBUSTION ENGINE

BACKGROUND OF THE INVENTION

1. Field of the Invention

The present invention relates to a device for detecting knocking in an internal combustion engine by using ionic current. More particularly, the invention relates to a device, for detecting knocking in an internal combustion engine, which does not erroneously detect knocking even when spike noise is generated.

2. Prior Art

In an internal combustion engine using gasoline as a fuel, a gas mixture compressed by a piston is ignited by a spark plug and is burned to produce an output. That is, in normal combustion, a flame nucleus in a gas mixture is formed near the gap of the spark plug, and propagates over the whole combustion chamber.

The ignition timing of the spark plug has an intimate relationship with the output of the internal combustion engine. When the ignition timing is too late, the propagating speed of flame becomes slow. Therefore, the combustion becomes slow resulting in a decrease in the combustion efficiency and, hence, in a decrease in the output of the internal combustion engine.

When the ignition timing is too early, on the other hand, the propagation of frame is fast, whereby a maximum pressure of combustion rises and the output of the internal combustion engine increases. When the ignition timing is too early, however, there takes place knocking in which the mixture is self-ignited prior to the propagation of the flame, often damaging the internal combustion engine.

That is, it is advantageous to operate the internal combustion engine in a region where the ignition timing is set just before the occurrence of knocking (MBT: minimum spark advance for best torque) from the standpoint of fuel efficiency and output. It is very important to reliably detect the occurrence of knocking.

A knock sensor which is a vibration sensor has heretofore been used for detecting knocking. However, a device has been studied which detects knocking by utilizing the phenomenon that ions are generated in the combustion chamber due to the combustion of the mixture and an ionic current flows.

FIG. 1 is a diagram schematically illustrating an ignition circuit for the internal combustion engine, wherein an end of a primary coil 111 of an ignition coil 11 is connected to the positive electrode of a battery 12. The other end is grounded via the collector and the emitter of a switching transistor 13 included in an igniter.

The base of the transistor 13 is connected to an ignition timing control unit 14, so that the transistor 13 is turned on when an ignition signal IGT is output from the ignition timing control unit 14.

An end of a secondary coil 112 of the ignition coil 11 is also connected to the positive electrode of the battery 12, and the other end is connected to a spark plug 8 through a reverse-current preventing diode 15, a distributor (not shown) and a high-tension cable 18.

An ionic current detecting unit 17 is connected to the other end of the secondary coil 112 of the ignition coil 11 in parallel with the spark plug 16.

The ionic current is supplied, through a protection diode 171, to a series circuit of a current-to-voltage converting resistor 172 and a bias power source 173. A voltage generated at a point where the current-to-voltage conversion resistor 172 and the protection diode 171 are connected together, is applied to an amplifying circuit 175 comprised of an operational amplifier and a resistor through a capacitor 174 for removing a DC component.

Therefore, a voltage signal proportional to the AC component of the ionic current is output at an output terminal 176 of the ionic current detecting unit 17.

FIGS. 2A to 2E are diagrams of waveforms at each of the portions of the ignition circuit (FIG. 1) and show, respectively, an ignition signal IGT, a voltage on the grounding side of the primary coil (point P), a voltage on the high-tension side of the secondary coil (point S), and a voltage input to the ionic current detecting unit (point I). All abscissa represent time.

When the ignition signal IGT turns to the "H" level at $t_1$, the transistor 13 is turned on and the voltage at point P drops. Immediately after $t_1$, a negative high-voltage pulse is generated at point S, that is, on the high-voltage side of the secondary coil. However, the current is blocked by the reverse current-preventing diode 15 from flowing into the spark plug 16 and the ionic current detecting unit 17.

When the ignition signal IGT turns to the "L" level at $t_2$ and the transistor 13 is cut off, a voltage at point P abruptly rises, and a positive high-voltage pulse is generated at point S.

The positive high-voltage pulse is not blocked by the reverse current-preventing diode 15 and flows into the spark plug 16 to be discharged. It is prevented by the protection diode 171 from flowing into the ionic current detecting unit 17.

Furthermore, from $t_3$ to $t_4$ after the discharge of the spark plug 16, LC resonance is triggered by energy remaining in the ignition coil 11 due to parasitic inductance and parastic capacitance of the high-tension cable 18 and the like.

The gas mixture in the cylinder is ignited by the discharge of the spark plug 16, ions are generated in the cylinder as the flame spreads, and an ionic current starts flowing. The ionic current increases with an increase in the pressure in the cylinder and decreases with a decrease in the pressure in the cylinder.

When knocking occurs in the internal combustion engine, knocking signals in a particular frequency band (6 to 7 KHz) are superposed while the ionic current decreases after having reached its peak.

In order to detect the knocking using the ionic current, therefore, it is desired to detect only the knocking signals in particular frequency band and reject other signals (e.g., LC resonance wave). For this purpose, therefore, it is desired to provide a knocking window which opens at $t_5$ after no extra signal exists and closes at a suitable moment (e.g., ATDC 60°) after the ionic current has decreased, and to detect the knocking based upon the output of the ionic current detecting unit 17 while the knocking window is opened.

"A method of detecting knocking based on an ionic current" has been already proposed (see Japanese Unexamined Patent Publication (Kokai) No. 6-159129). According to this invention, a knocking signal is separated from the output signal of the ionic current detecting unit 17 using a band-pass filter, the separated knocking signals are integrated, and knocking is detected based on the integrated signal.

FIG. 3 is a block diagram according to the above-mentioned publication, wherein the output of the ionic current detecting unit 175 is supplied to a processing unit 34 through a band-pass filter (BPF) unit 32 and an integrating (or peak-holding) unit 33. The operation of the integrating (or peak-holding) unit 33 is controlled by a window which is opened after a predetermined period determined depending upon the engine speed and the load and is closed at a moment corresponding to about 50° CA.

The noise component is rejected by utilizing the fact that the integrated value of noise estimated to be an instantaneous change of the ion concentration stepwisely increases whereas the integrated value of knocking signals increases continuously.

It has also been widely known to provide an LC resonance masking unit 31 between the ionic current detecting unit 17 and the BPF unit 32 in order to reject the effect of LC resonance after the electric discharge.

The ionic current detecting unit 17, however, detects a very small ionic current and must have a very high input impedance and gain, and inevitably picks up the spike noise due to corona discharge of the spark plug 16. Besides, the spike noise has wide frequency spectra and cannot be rejected by the BPF unit 32, and is generated irregularly. Accordingly, it is difficult to reliably separate the spike noise from the knocking, and the spike noise may often be erroneously detected as the occurrence of knocking.

FIGS. 4A to 4E are diagrams explaining the above-mentioned problem, and show, respectively, an output of the LC resonance masking unit 31, outputs of the BPF unit 32 and knocking window, output of the peak-holding unit and output of the integrating unit. All the abscissa represent time.

That is, before $t_{10}$, the output of the ionic current detecting unit 17 is masked by the LC resonance masking unit 31, and only after $t_{11}$ is a signal output from the LC resonance masking unit. For instance, the knocking window is opened between 10° ATDC and 60° ATDC, and the peak-holding operation or the integration operation is started.

When knocking occurs after 10° ATDC, the output of the peak-holding unit or of the integrating unit increases. When the knocking level is small, however, the output does not exceed the threshold level $L_{TH}$.

When a spike noise is generated at $t_{11}$, however, the output of the peak-holding unit or the integrating unit may become larger than the threshold level $L_{TH}$ being affected by the knocking frequency component in the spike noise. In such a case, the processing unit 34 erroneously detects the spike noise as knocking.

When it is erroneously detected that the knocking is occuring though the knocking is not really occurring, the ignition timing is delayed to suppress the knocking, resulting in deterioration of fuel efficiency and output.

The present invention provides a device for detecting knocking of an internal combustion engine, which does not erroneously detect spike noise as knocking even when it is generated.

SUMMARY OF THE INVENTION

A device for detecting knocking of an internal combustion engine according to a first invention comprises:

an ionic current detecting means which applies a voltage across a pair of electrodes installed in a combustion chamber of the internal combustion engine, and detects the ionic current flowing between the pair of electrodes through ions generated when a gas mixture in the combustion chamber has burned;

a separating means for separating the output signal of said ionic current detecting means into a signal with a particular frequency band representing the occurrence of knocking and a signal with frequency components other than said particular frequency band;

determining means for determining whether or not knocking is occurring based upon the signals in said particular frequency band separated by said separating means; and a prohibiting means for prohibiting the functioning of said determinating means based upon the signal with frequency components other than said particular band separated by said separating means.

According to this device, the ionic current is separated into a knocking frequency component and frequency components other than the knocking frequency component and, when the frequency components other than the knocking frequency are greater than a predetermined level, determinating whether or not knocking occurs based on the knocking frequency component is prohibited so that erroneous discrimination may not be caused by the spike noise.

In the device for detecting knocking of an internal combustion engine according to the second invention, the separating means separates the output signals of the ionic current detection means into signals of a particular frequency component representing the occurrence of knocking and signals having frequency components higher than the particular frequency.

In this device, the presence of spike noise is discriminated based upon the frequency components higher than the knocking frequency.

The device for detecting knocking of an internal combustion engine according to a third invention further comprises a resetting means for resetting the prohibition by the prohibiting means when the signal with frequency component other than the particular frequency band separated by the separating means is greater than a predetermined first value and when the signal of a particular frequency band separated by the separating means is greater than a predetermined second value.

According to this device, determinating whether or not knocking occurs based upon the knocking frequency component is possible even when the spike noise is detected but the knocking frequency component is greater than a predetermined level.

BRIEF DESCRIPTION OF THE DRAWINGS

FIGS. 2A to 2E are diagrams of voltage waveforms at each portion of the ignition circuit;

DETAILED DESCRIPTION OF THE PREFERRED EMBODIMENTS

Figure 1:
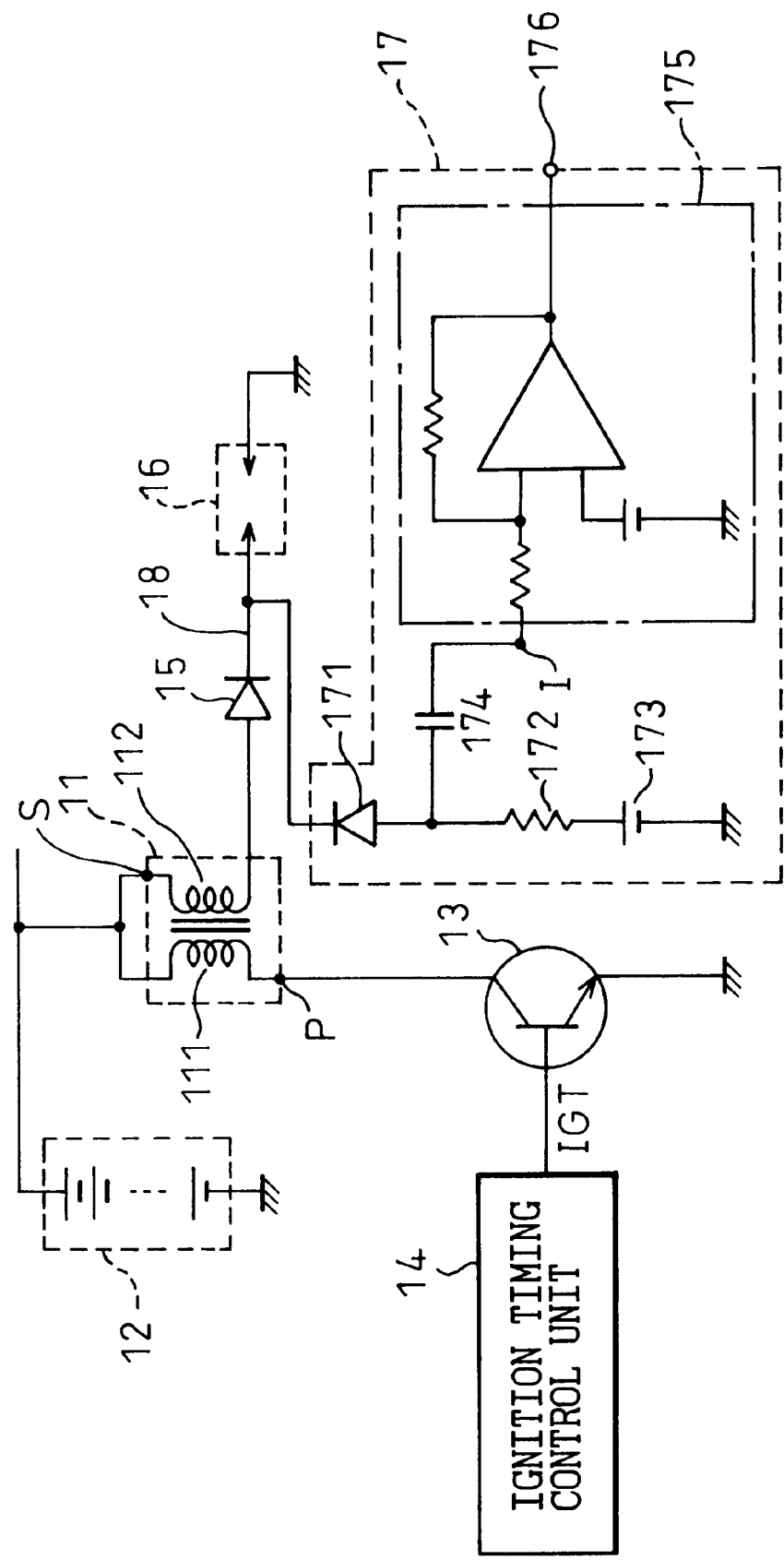
FIG. 1 is a diagram schematically illustrating an ignition circuit for an internal combustion engine.
Figure 3:
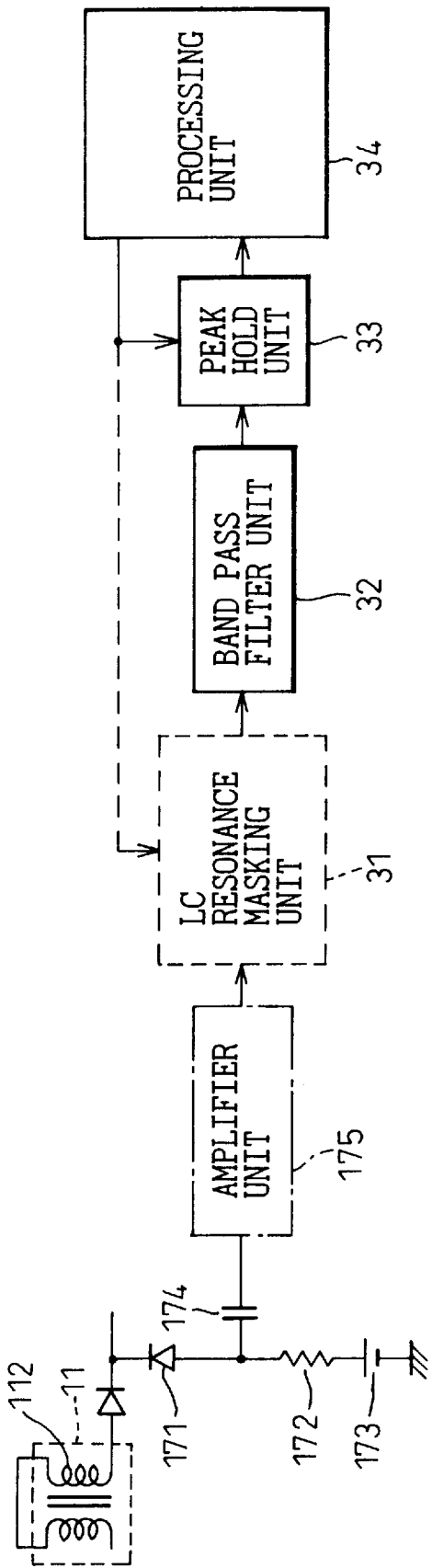
FIG. 3 is a diagram illustrating the constitution of a device for detecting knocking relying upon ionic current.
Figure 4:
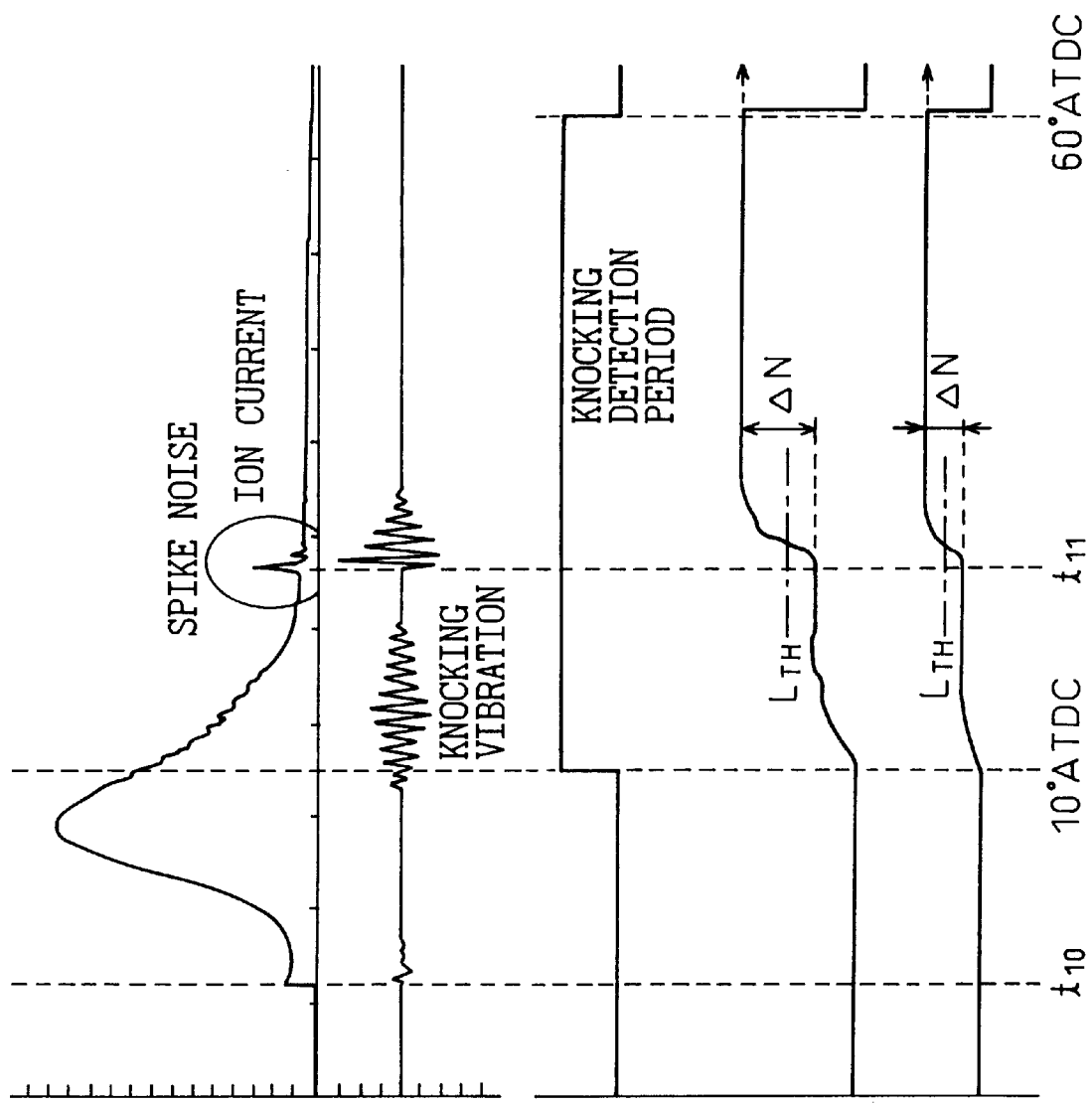
FIGS. 4A to 4E are diagrams explaining the problem.
Figure 5:
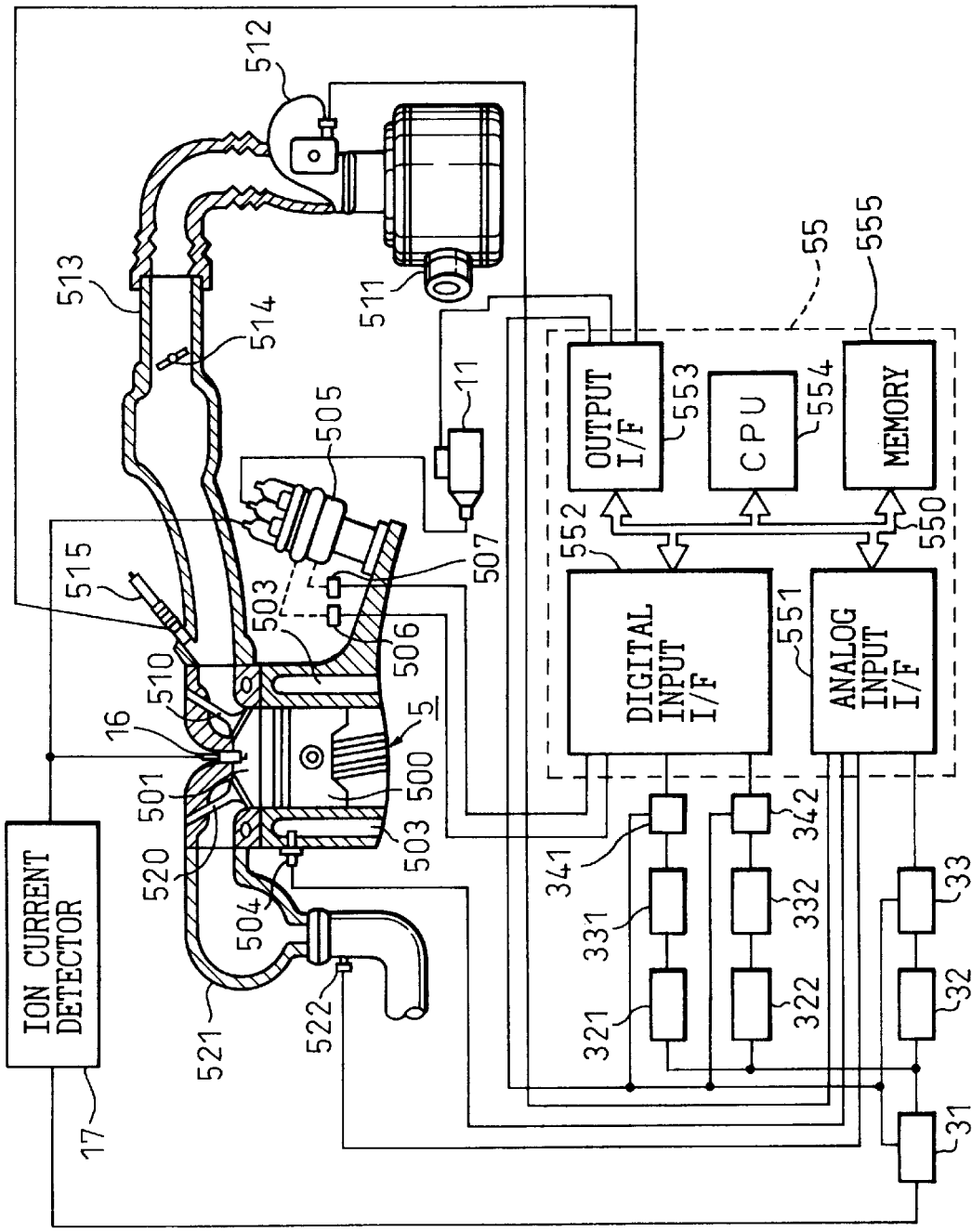
FIG. 5 is a diagram illustrating a first embodiment of a device for detecting knocking of an internal combustion engine according to the present invention.

FIG. 5 is a diagram illustrating the first embodiment of a device for detecting knocking of an internal combustion engine according to the present invention. A mixture of air taken in through an air cleaner 511 and fuel injected from a fuel injection valve 515, is supplied into a combustion chamber 501 defined by a piston 500, an intake valve 510 and an exhaust valve 520 in an internal combustion engine 5.

The amount of the intake air is measured by an air flow meter 512, and is adjusted by a throttle valve 514 disposed on an intake pipe 513.

The mixture compressed by the piston 500 is ignited by the electric discharge of a spark plug 16 near the top dead center of the piston 500, and expands to produce a force that pushes down the piston 500.

Exhaust gas after the combustion is exhausted into an exhaust pipe 521 through the exhaust valve 520, and the oxygen concentration in the exhaust gas is detected by an air-to-fuel ratio sensor 522 installed in the exhaust pipe 521.

The temperature of the cooling water for cooling the internal combustion engine 5 is detected by a cooling water temperature sensor 504 inserted in a water jacket 503.

The ionic current flowing in the combustion chamber 501 is supplied to the LC resonance masking unit 31 through the spark plug 16 and the ionic current detecting unit 17. The output of the LC resonance masking unit 31 is fed, through the band-pass filter 32 that permits the passage of only that frequency band (6 to 7 KHz) specific to the knocking, to the peak-holding unit 33 that holds a peak in the output of the band-pass filter 32. It is also fed to a low-frequency component latching unit 341 through a low-frequency band-pass filter 321 that permits the passage of only those frequency components (e.g., 1 to 2 KHz components) lower than the frequency specific to the knocking and a low-frequency component comparator 331, and to a high-frequency component latching unit 342 through a high-frequency band-pass filter 322 that permits the passage of only those frequency components (e.g., 14 to 16 KHz components) higher than the frequency specific to the knocking and a high-frequency component comparator 332. It is also allowable to use an integrating unit for integrating the outputs of the band-pass filter 32, instead of the peak-holding unit 33.

The peak-holding unit 33, the low-frequency component latching unit 341 and the high-frequency component latching unit 342 are connected to a processing unit 55.

The processing unit 55 is a microcomputer system which is constituted by an analog input interface (I/F) 551, a digital input I/F 552, an output I/F 553, a CPU 554, a memory 555 and a bus 550.

That is, the output of the peak-holding unit 33 is connected to the analog input I/F 551. The air flow meter 512, cooling water temperature sensor 504 and air-to-fuel ratio sensor 522 are further connected to the analog input I/F 551. The low-frequency component latching unit 341 and the high-frequency component latching unit 342 are connected to the digital input I/F 552.

The output I/F 553 outputs a valve opening command to the fuel injection valve 515 and, further, outputs an ignition command signal IGT and an ionic current fetching control signal.

That is, the ignition command signal IGT is boosted through the ignition coil 11, and is sent to the spark plug 16 through the distributor 505. The distributor 505 contains a crank angle sensor 506 which generates a pulse signal every, for example, 30° CA (crank angle) and a reference angle sensor 507 which generates a pulse signal every, for example, 720° CA. Outputs of these sensors are supplied by the processing unit 55 through the digital input I/F 552 and are used for calculating engine speed Ne, for controlling the timings for opening and closing the fuel injection valve 515 and for controlling the timing for outputting the ignition command signal IGT.

While LC resonance is occuring, the ionic current fetching control signal turns off the LC resonance masking unit 31 to prevent the LC resonance wave from being fetched, and the ionic current fetching control signal is supplied to the peak-holding unit 33, to the low-frequency component latching unit 341 and to the high-frequency component latching unit 342 to permit the operations of the peak-holding unit 33, low-frequency component latching unit 341 and high-frequency component latching unit 342 while the knocking window is being opened.

Figure 6:
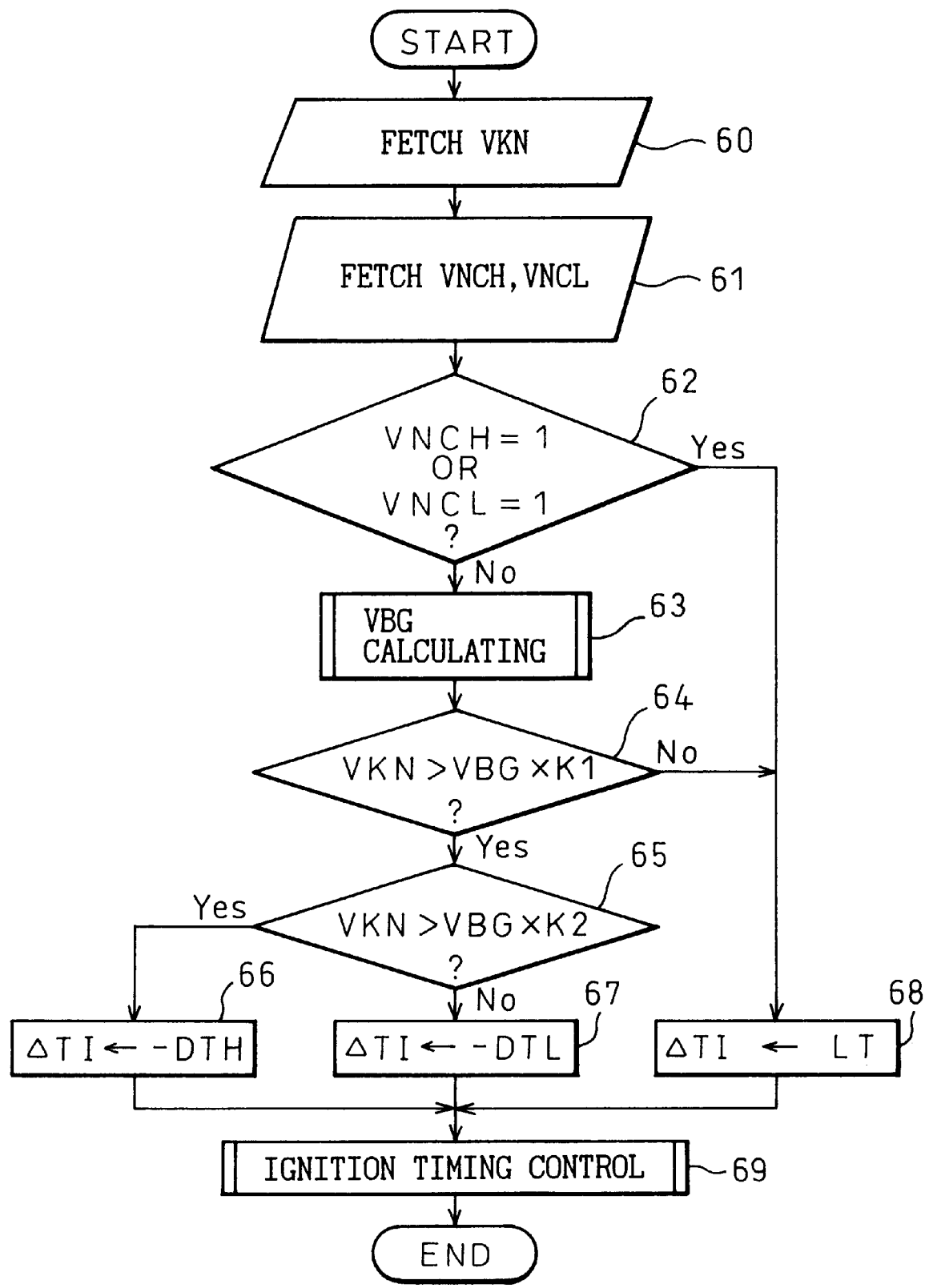
FIG. 6 is a flow chart of a first knocking control routine.

FIG. 6 is a flow chart of a first knocking control routine executed by the CPU 554 in the processing unit 55 according to a first embodiment. This routine is executed every ignition timing calculation for each cylinder of the internal combustion engine 5, and the variables are determined for each cylinder.

A peak VKN of the ionic current held by the peak-holding unit 33 is fetched at step 60, and signal levels VNCH and VNCL latched by the low-frequency component latching unit 341 and high-frequency component latching unit 342 respectively are fetched at step 61.

At step 62, it is determined whether or not at least either one of VNCL latched in the low-frequency component latching unit 341 and VNCH latched in the high-frequency component latching unit 342 has the level "1", that is, it is determined whether or not the level of a frequency component other than the knocking frequency band is higher than a predetermined level in the ionic current.

When the determination at step 62 is negative, that is, when the frequency component other than the knocking frequency band is higher than the predetermined level, the control proceeds to step 63 where a background VBG calculation subroutine is executed. This subroutine will be explained later.

At step 64, it is determined whether or not the peak VKN of the ionic current is higher than a product of a predetermined first coefficient (K1) and the background VBG. When the determination is affirmative, it is determined at step 65 whether or not the peak VKN of the ionic current is larger than a product of a predetermined second coefficient (K2) and the background VBG. Where 0<K1<K2.

When the determination at step 65 is affirmative, that is, when the knocking level is high, an ignition timing correction factor ΔTI is set to a predetermined large delay angle (−DTH) at step 66, and the control proceeds to step 69.

When the determination at step 65 is negative, that is, when it is determined that the knocking level is low, the ignition timing correction factor ΔTI is set to a predetermined small delay angle (−DTL) at step 67, and the control proceeds to step 69.

When the determination at step 62 is affirmative, that is, when it is determined that spike noise other than knocking has a high level, the ignition timing correction factor is set to a predetermined advancing angle LT as knocking is regarded as not occurring because an erroneous determination may be caused.

When the determination at step 64 is negative, that is, when it is determined that knocking is not actually occuring, the control proceeds to the step 68.

It is presumed that 0<LT<DTL<DTH. This is for the purpose that when no knocking is occurring, the ignition timing is gradually advanced and when the knocking occurs, the ignition timing is largely delayed at one stroke to suppress the knocking. In this embodiment, furthermore, the angle is delayed in large amounts when the knocking level is high to enhance the effect of suppression.

An ignition timing control processing is executed at step 69 to be terminated the routine. The ignition timing control processing will be explained later.

Figure 7:
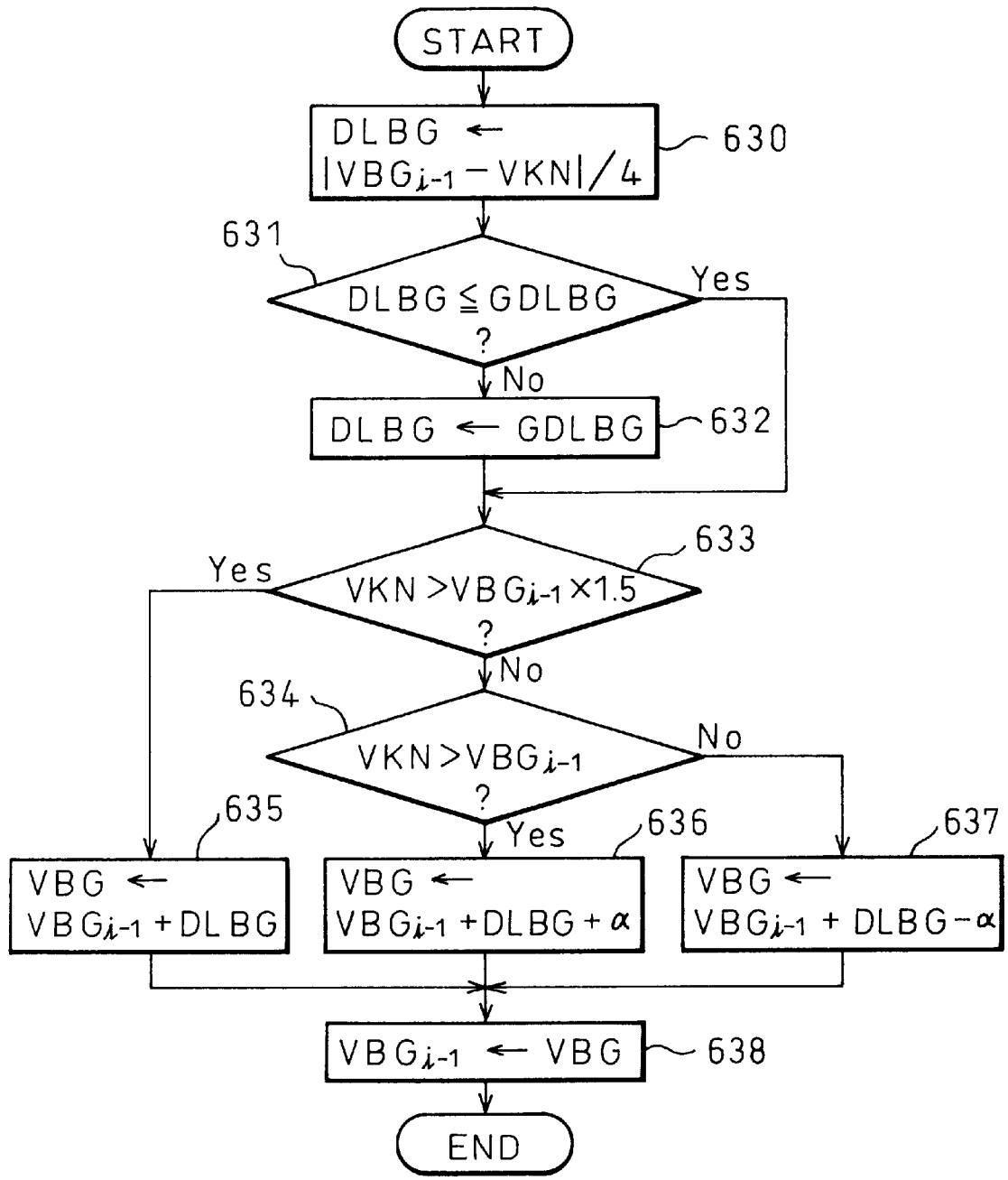
FIG. 7 is a flow chart of a background calculation subroutine.

FIG. 7 is a flow chart of a background calculation subroutine executed at step 63 of the first knocking control routine. An updating amount DLBG is calculated at step 630 according to the following formula, $$DLBG \leftarrow |VBG_{i-1} - VKN|/4$$

where $VBG_{i-1}$ is a background calculated the previous time, and the updating amount DLBG is calculated as a value one-fourth of the absolute value of a difference between the background calculated at the previous execution and a peak value VKN at this execution.

At steps 631 and 632, the updating amount DLBG is limited to a predetermined upper-limit guard value GDLBG.

At steps 633 and 634, it is determined whether or not the peak value VKN at this execution is larger than a product of a predetermined coefficient which is larger than 1.0 and $VBG_{i-1}$, smaller than the product and larger than $VBG_{i-1}$, or smaller than $VBG_{i-1}$.

When the peak value VKN is larger than $VBG_{i-1}$ multiplied by the predetermined coefficient, the background VBG is updated at step 635 according to the following formula, $$VBG \leftarrow VBG_{i-1} + DLBG$$

When the peak value VKN is smaller than $VBG_{i-1}$ multiplied by the predetermined coefficient but is larger than $VBG_{i-1}$, the background VBG is updated at step 636 according to the following formula, $$VBG \leftarrow VBG_{i-1} + DLBG + \alpha$$

When the peak value VKN is smaller than $VBG_{i-1}$, the background VBG is updated at step 637 according to the following formula, $$VBG \leftarrow VBG_{i-1} + DLBG - \alpha$$

where $\alpha$ is an adjustment coefficient for setting the background VBG to limit within a suitable range.

Finally, at step 638, the $VBG_{i-1}$ is set to the background VBG calculated at this execution to be ready for the operation of the next execution, and this subroutine is terminated.

Figure 8:
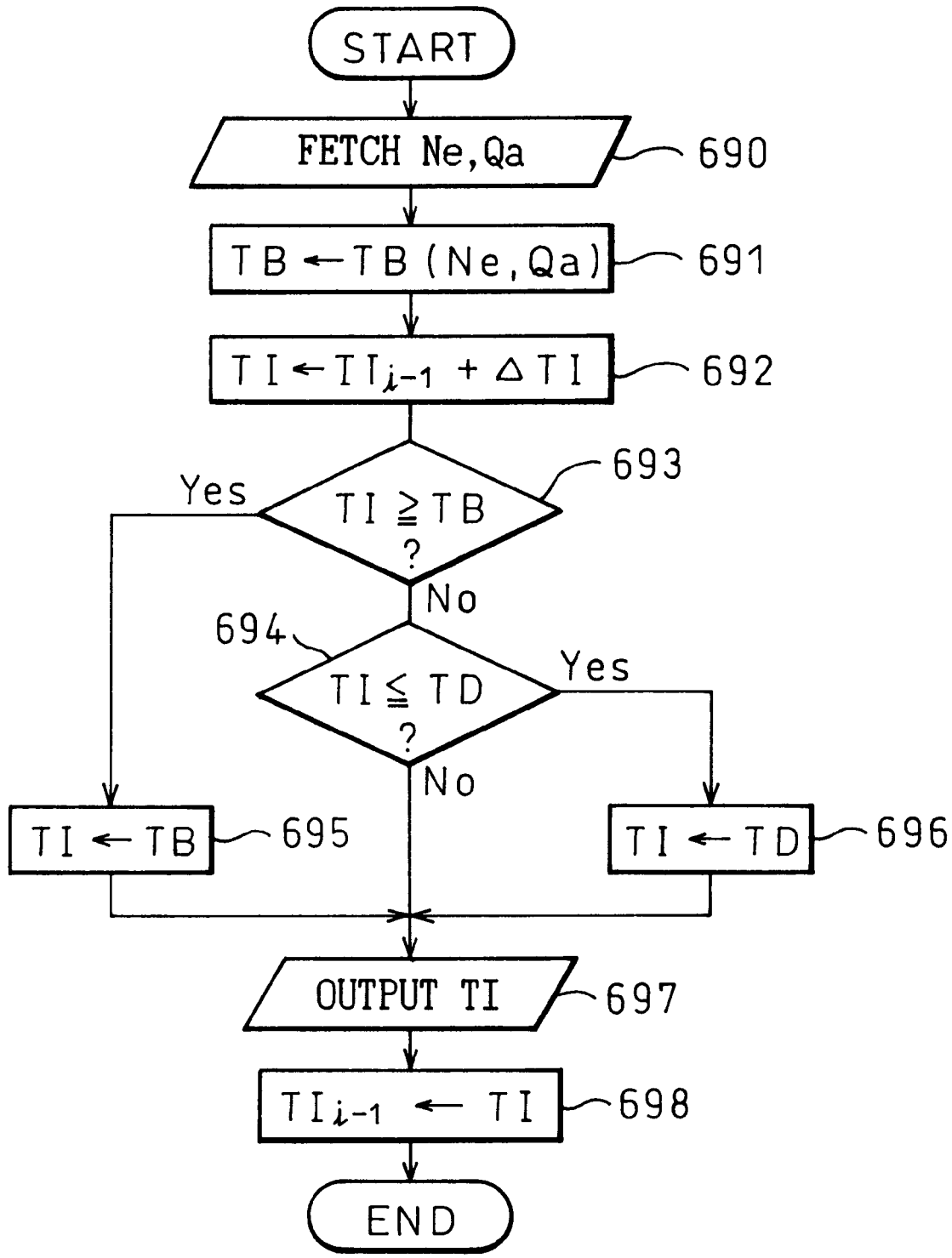
FIG. 8 is a flow chart of an ignition timing control subroutine.

FIG. 8 is a flow chart of the first ignition timing control subroutine executed at step 69 in the first knocking control routine. The engine speed Ne determined depending upon a pulse output from the crank angle sensor 506 and the intake air amount Qa detected by the air flow meter 512, are fetched at step 690, and a reference ignition timing TB is calculated at step 691 as a function of the engine speed Ne and the intake air amount Qa according to the following formula, $$TB \leftarrow TB (Ne, Qa)$$

At step 692, the ignition timing correction factor $\Delta TI$ is added to the ignition timing $TI_{i-1}$ calculated at the previous execution, to calculate the ignition timing TI at this execution, $$TI \leftarrow TI_{i-1} + \Delta TI$$

In this embodiment, the ignition timing is advanced when a positive number is added and is delayed when a positive number is subtracted.

At steps 693 and 694, it is determined whether or not the ignition timing TI at this execution is between the reference ignition timing TB which is the maximum advanced ignition timing and a predetermined maximum delayed ignition timing TD.

That is, when the ignition timing TI at this execution is more advanced than the reference ignition timing TB, the determination at step 693 is affirmative, the ignition timing TI at this execution is replaced by the reference ignition timing TB at step 695, and the control proceeds to step 697.

Conversely, when the ignition timing TI at this execution is more delayed than the maximum delayed ignition timing TD, the determination at step 694 is negative, the ignition timing TI at this execution is replaced by the maximum delayed ignition timing TD at step 696, and the control proceeds to step 697. When the ignition timing TI at this execution is between the reference ignition timing TB and the maximum delayed ignition timing TD, the control directly proceeds to step 697.

At step 697, the ignition command signal IGT is output to the ignition coil 11 through the output I/F 553, the ignition timing $TI_{i-1}$ calculated at the previous execution is updated to the ignition timing TI at this execution to be ready for the calculation of the next execution, and this subroutine is terminated.

That is, according to the first knocking control routine, when spike noise other than knocking signals larger than a predetermined level is superposed on the ionic current, the detection of knocking is interrupted in order to prevent an erroneous determinating that the spike noise is regarded as knocking.

When the detection of knocking is interrupted in the first knocking control routine, however, it is regarded that no knocking is occuring and the ignition timing is not delayed. When the knocking is actually occuring in a state where high spike noise is being generated, therefore, the ignition timing is not delayed for suppressing the knocking, and the internal combustion engine may be damaged.

Figure 9:
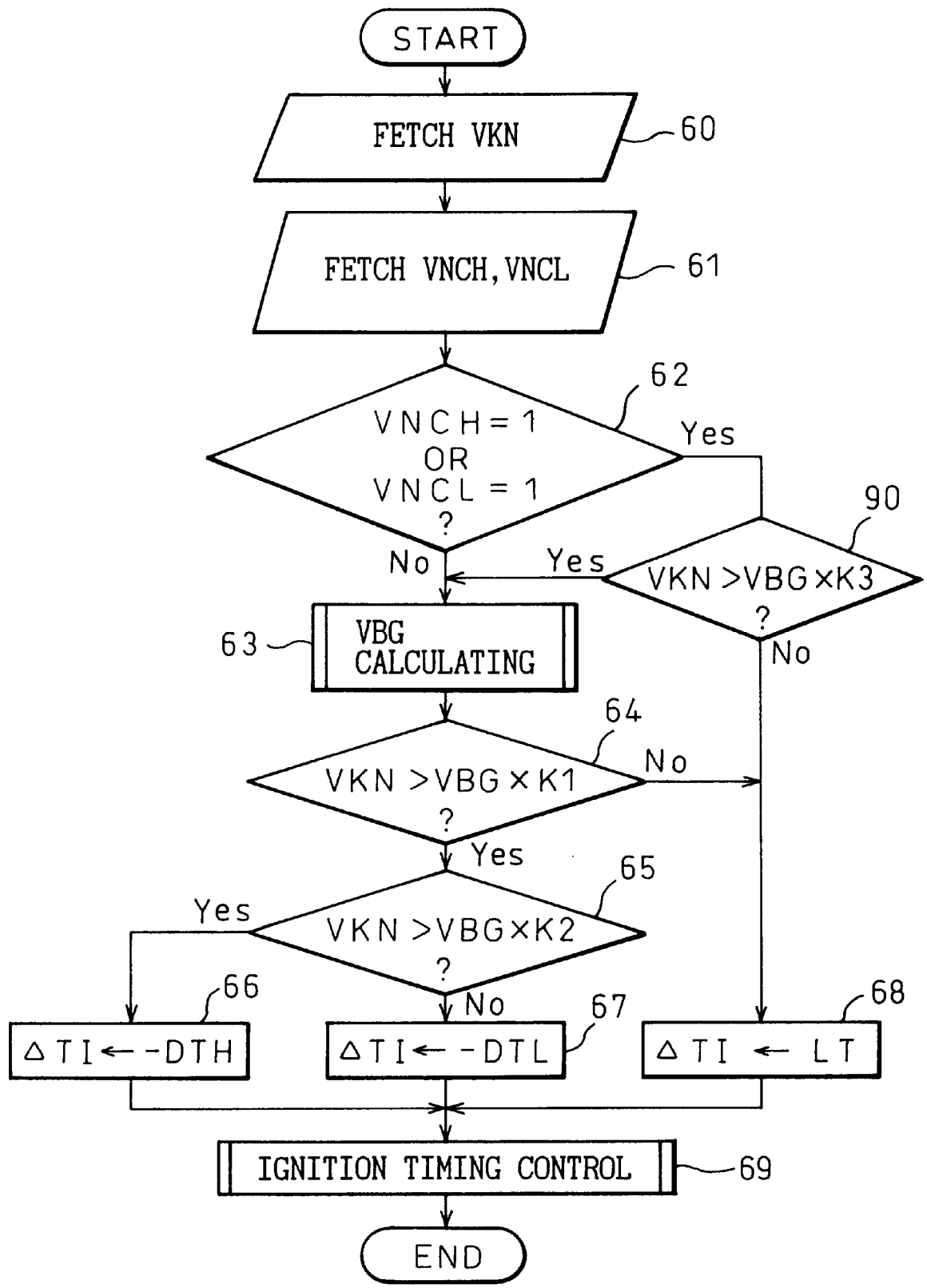
FIG. 9 is a flow chart of a second knocking control routine.

FIG. 9 is a flow chart of a second knocking control routine and provides step 90 between step 62 and 68 of the first knocking control routine in order to solve the above-mentioned problem.

That is, when the spike noise is higher than a predetermined level and the determination at step 62 is affirmative, it is determined at step 90 whether or not a peak value VKN at this execution is larger than $(VBG_{i-1} \times K3)$.

When the determination at step 90 is affirmative, that is, when the peak value of the knocking signal is high though the noise level is higher than a predetermined level, it is regarded as the knocking is occuring, and the ignition timing is delayed at the steps 63 to 67.

That is, the knocking is suppressed by delaying the ignition timing and the internal combustion engine is prevented from being damaged.

In the above-mentioned first embodiment, the spike noise level is detected by using the comparators 331, 332 and the latching units 341, 342 using hardware technology. However, the spike noise level can be detected by the peak-holding unit as is the knocking signal level.

Figure 10:
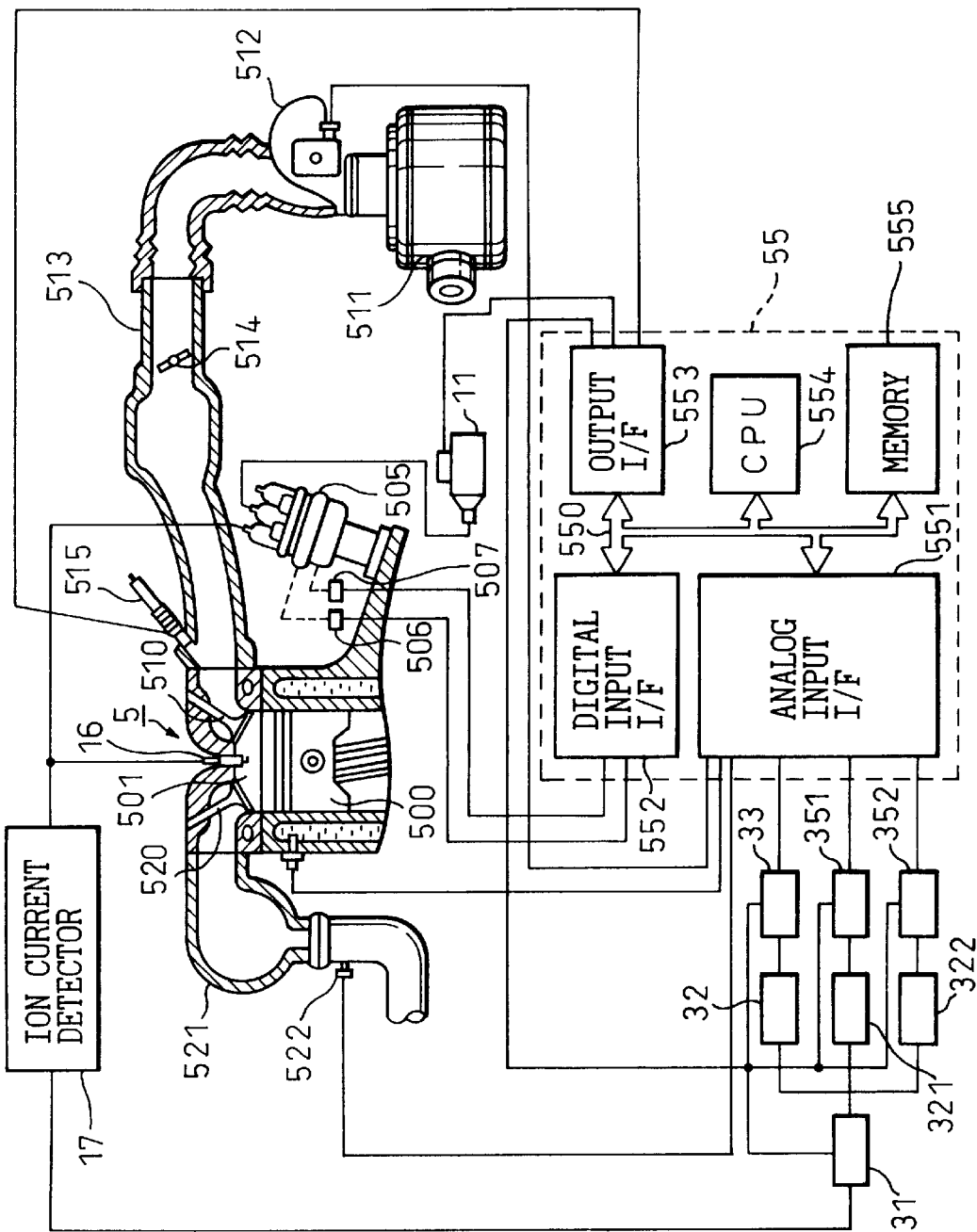
FIG. 10 is a diagram illustrating a second embodiment of a device for detecting knocking of an internal combustion engine according to the present invention.

FIG. 10 is a diagram illustrating the second embodiment of a device for detecting knocking of an internal combustion engine according to the present invention, wherein a low-frequency component peak-holding unit 351 and a high-frequency component peak-holding unit 352, which are connected to the analog input I/F 551 of the processing unit 55, are provided instead of the comparators 331, 332 and the latching units 341, 342.

It is also allowable to use a low-frequency component integrating unit and a high-frequency component integrating unit in place of the low-frequency component peak-holding unit 351 and the high-frequency component peak-holding unit 352.

Figure 11:
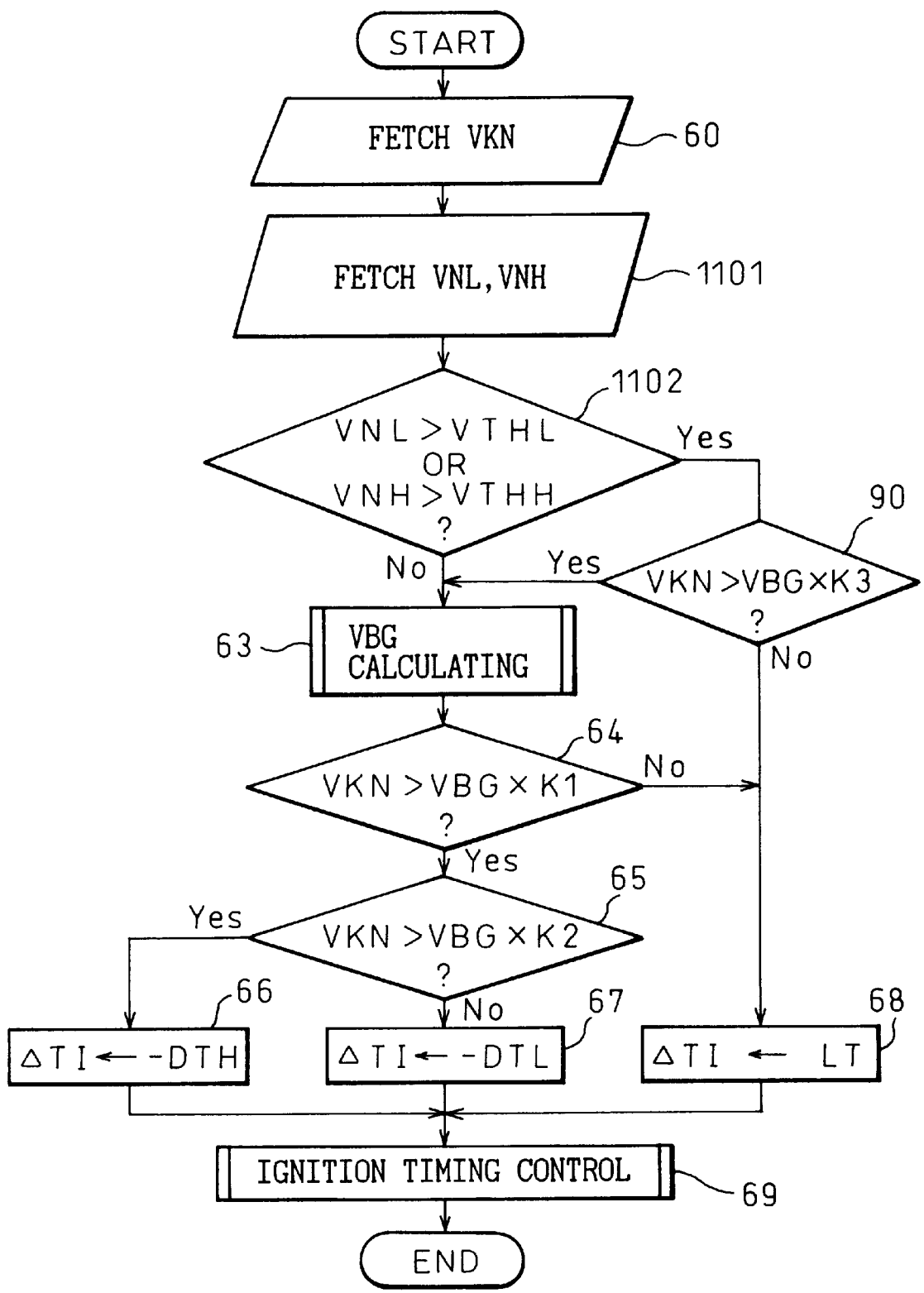
FIG. 11 is a flow chart of a third knocking control routine.

FIG. 11 is a flow chart of a third knocking control routine executed by the processing unit 55 according to the second embodiment, wherein steps 61 and 62 of the second knocking control routine are replaced by steps 1101 and 1102.

At step 1101, the low-frequency component peak value VNL and the high-frequency component peak value VNH which are respectively the outputs of the low-frequency component peak-holding unit 351 and high-frequency component peak-holding unit 352 are fetched through the analog input I/F 551.

At step 1102, it is determined whether or not the low-frequency component peak value VNL is higher than a predetermined low-frequency component threshold value VTHL or whether or not the high-frequency component peak value VNH is higher than a predetermined high-frequency component threshold value VTHH. The low-frequency component threshold value VTHL and the high-frequency component threshold value VTHH may be determined as fixed constant or as functions of the engine speed of the internal combustion engine.

When the determination at step 1102 is negative, it is regarded that no spike noise is occurring and, determination whether or not knocking is occuring and delaying of the ignition timing are executed at the steps 63 to 67.

When the determination at step 1102 is affirmative, it is regarded that the spike noise is occurring, and the control proceeds to step 90 where it is determined whether or not the knocking level is high irrespective of the generation of spike noise.

When the determination at step 1102 is affirmative, it is possible that determining whether or not knocking is occurring is interrupted, and the control directly proceeds to step 68 to execute steps of the first knocking control routine for advancing the ignition timing.

According to the first and second embodiments as described above, the noise is detected based upon both of the frequency component lower than the knocking frequency and the frequency component higher than the knocking frequency. The noise, however, may be detected based upon either one of them.

Here, frequency components lower than the knocking frequency are affected by the disturbance of flame in the combustion chamber 501. It is therefore advantageous to detect the spike noise based upon the frequency components of higher than the knocking frequency.

In the above-mentioned embodiments, furthermore, it is determined that the spike noise is generated when either one of the frequency component lower than the knocking frequency or the frequency component higher than the knocking frequency is higher than a predetermined level (steps 62 and 1102). By taking into consideration the fact that the spike noise has wide frequency band component, it is also possible to judge that the spike noise is being generated when both of the frequency component lower than the knocking frequency and the frequency component higher than the knocking frequency are higher than the predetermined level.

We claim:
1. A device for detecting knocking in an internal combustion engine comprising:
    an ionic current detecting unit which applies a voltage across a pair of electrodes installed in a combustion chamber of the internal combustion engine and detects an ionic current flowing between the pair of electrodes when mixture gas in the combustion chamber is burned;
    means for separating a signal output from the ionic current detecting unit into a first component signal within a preselected frequency range corresponding to a knocking condition and a second component signal including portions of the output of the ionic current detecting unit outside the preselected frequency range;
    means for determining whether knocking is occurring based upon the first component signal; and
    means for prohibiting functioning of the determining means based upon the second component signal.

2. A device for detecting knocking in an internal combustion engine according to claim 1, wherein the determining means determines whether knocking is occurring based upon a peak value, within a predetermined period of time, of the first component signal.

3. A device for detecting knocking in an internal combustion engine according to claim 1, wherein the determining means determines whether knocking is occurring based upon an integrated value, within a predetermined period of time, of the first component signal.

4. A device for detecting knocking in an internal combustion engine according to claim 1, wherein the second component signal includes a high frequency portion having frequencies higher than an upper limit of the preselected frequency range and a low frequency portion having frequencies lower than a lower limit of the preselected frequency range and wherein the prohibiting means prohibits the determining means from determining whether knocking is occurring when, during a predetermined period of time, both a first peak value of the high frequency portion and a second peak value of the low frequency portion are higher than a predetermined threshold.

5. A device for detecting knocking in an internal combustion engine according to claim 1, wherein the second component signal includes a high frequency portion having frequencies higher than an upper limit of the preselected frequency range and a low frequency portion having frequencies lower than a lower limit of the preselected frequency range and wherein the prohibiting means prohibits the determining means from determining whether knocking is occurring when, during a predetermined period of time, either one a first peak value of the high frequency portion and a second peak value of the low frequency portion is higher than a predetermined threshold.

6. A device for detecting knocking in an internal combustion engine according to claim 1, wherein the second component signal includes a high frequency portion having frequencies higher than an upper limit of the preselected frequency range and a low frequency portion having frequencies lower than a lower limit of the preselected frequency range and wherein the prohibiting means prohibits the determining means from determining whether knocking is occurring when, during a predetermined period of time, both a first integrated value of the high frequency portion and a second integrated value of the low frequency portion are higher than a predetermined threshold.

7. A device for detecting knocking in an internal combustion engine according to claim 1, wherein the second component signal includes a high frequency portion having frequencies hither than an upper limit of the preselected frequency range and a low frequency portion having frequencies lower than a lower limit of the preselected frequency range and wherein the prohibiting means prohibits the determining means from determining whether knocking is occurring when, during a predetermined period of time, either one of a first integrated value of the high frequency portion and a second integrated value of the low frequency portion is higher than a predetermined threshold.

8. A device for detecting knocking in an internal combustion engine according to claim 4, wherein the predetermined threshold value is determined as a function of the engine speed of the internal combustion engine.

9. A device for detecting knocking in an internal combustion engine according to claim 5, wherein the predetermined threshold value is determined as a function of the engine speed of the internal combustion engine.

10. A device for detecting knocking in an internal combustion engine according to claim 6, wherein the predetermined threshold value is determined as a function of the engine speed of the internal combustion engine.

11. A device for detecting knocking in an internal combustion engine according to claim 7, wherein the predetermined threshold value is determined as a function of the engine speed of the internal combustion engine.

12. A device for detecting knocking in an internal combustion engine according to claim 1, wherein the second component signal includes frequencies higher than an upper limit of the preselected frequency range.

13. A device for detecting knocking in an internal combustion engine according to claim 12, wherein the prohibiting means prohibits the determining means from determining whether knocking is occurring when, during a predetermined period of time, a peak value of the second component signal is greater than a predetermined threshold.

14. A device for detecting knocking in an internal combustion engine according to claim 12, wherein the prohibiting means prohibits the determining means from determining whether knocking is occurring when, during a predetermined period of time, an integrated value of the second component signal is greater than a predetermined threshold.

15. A device for detecting knocking in an internal combustion engine according to claim 13, wherein the predetermined threshold value is determined as a function of the engine speed of the internal combustion engine.

16. A device for detecting knocking in an internal combustion engine according to claim 1, further comprising means for resetting the prohibiting means when an amplitude of the second component signal is higher than a predetermined first value and when an amplitude of the first component signal is higher than a predetermined second value.

17. A method for detecting knocking in an internal combustion engine comprising the steps of:
an ionic current detecting step for applying a voltage across a pair of electrodes installed in a combustion chamber of the internal combustion engine and detecting an ionic current flowing between the pair of electrodes when mixture gas in the combustion chamber is burned;
a separating step for separating a signal output from the ionic current detecting step into a first component signal within a preselected frequency range corresponding to a knocking condition and a second component signal including portions of the output of the ionic current detecting unit outside the preselected frequency range;
a determining step for determining whether knocking is occurring based upon the first component signal; and
a prohibiting step for prohibiting performance of the determining step based upon the second component signal.

18. A method for detecting knocking in an internal combustion engine according to claim 17, wherein the determining step determines whether knocking is occurring based upon a peak value, within a predetermined period of time, of the first component signal.

19. A method for detecting knocking in an internal combustion engine according to claim 17, wherein the determining step determines whether knocking is occurring based upon an integrated value, within a predetermined period of time, of the first component signal.

20. A method for detecting knocking in an internal combustion engine according to claim 17, wherein the second component signal includes a high frequency portion having frequencies higher than an upper limit of the preselected frequency range and a low frequency portion having frequencies lower than a lower limit of the preselected frequency range and wherein the prohibiting step prohibits the performance of the determining step when, during a predetermined period of time, both a first peak value of the high frequency portion and a second peak value of the low frequency portion are higher than a predetermined threshold.

21. A method for detecting knocking in an internal combustion engine according to claim 17, wherein the second component signal includes a high frequency portion having frequencies higher than an upper limit of the preselected frequency range of the first component signal and a low frequency portion having frequencies lower than a lower limit of the preselected frequency range of the first component signal and wherein the prohibiting step prohibits the performance of the determining step when, during a predetermined period of time, either one a first peak value of the high frequency portion and a second peak value of the low frequency portion is higher than a predetermined threshold.

22. A method for detecting knocking in an internal combustion engine according to claim 17, wherein the second component signal includes a high frequency portion having frequencies higher than an upper limit of the preselected frequency range and a low frequency portion having frequencies lower than a lower limit of the preselected frequency range and wherein the prohibiting step prohibits the performance of the determining step when, during a predetermined period of time, both a first integrated value of the high frequency portion and a second integrated value of the low frequency portion are higher than a predetermined threshold.

23. A method for detecting knocking in an internal combustion engine according to claim 17, wherein the second component signal includes a high frequency portion having frequencies higher than an upper limit of the preselected frequency range and a low frequency portion having frequencies lower than a lower limit of the preselected frequency range and wherein the prohibiting step prohibits the performance of the determining step when, during a predetermined period of time, either one of a first integrated value predetermined period of time, of a frequency component higher than the particular frequency separated at said separating of the high frequency portion and a second integrated value of the low frequency portion is higher than a predetermined threshold.

24. A method for detecting knocking in an internal combustion engine according to claim 20, wherein the predetermined threshold value is determined as a function of the engine speed of the internal combustion engine.

25. A method for detecting knocking in an internal combustion engine according to claim 21, wherein the predetermined threshold value is determined as a function of the engine speed of the internal combustion engine.

26. A method for detecting knocking in an internal combustion engine according to claim 22, wherein the predetermined threshold value is determined as a function of the engine speed of the internal combustion engine.

27. A method for detecting knocking in an internal combustion engine according to claim 23, wherein the predetermined threshold value is determined as a function of the engine speed of the internal combustion engine.

28. A method for detecting knocking in an internal combustion engine according to claim 17, wherein the second component signal includes frequencies higher than an upper limit of the preselected frequency range.

29. A method for detecting knocking in an internal combustion engine according to claim 28, wherein the prohibiting step prohibits the performance of the determining step when, during a predetermined period of time, a peak value of the second component signal is greater than a predetermined threshold.

30. A method for detecting knocking in an internal combustion engine according to claim 28, wherein the prohibiting step prohibits the performance of the determining step when, during a predetermined period of time, an integrated value of the second component signal is greater than a predetermined threshold.

31. A method for detecting knocking in an internal combustion engine according to claim 29, wherein the predetermined threshold value is determined as a function of the engine speed of the internal combustion engine.

32. A method for detecting knocking in an internal combustion engine according to claim 17, further comprising a resetting step for resetting the prohibiting means when an amplitude of the second component signal is higher than a predetermined first value and when an amplitude of the first component signal is higher than a predetermined second value.

* * * * *

UNITED STATES PATENT AND TRADEMARK OFFICE
CERTIFICATE OF CORRECTION

PATENT NO. : 6,151,954
DATED : November 28, 2000
INVENTOR(S) : Keiichiro Aoki et al.

Page 1 of 1

It is certified that error appears in the above-identified patent and that said Letters Patent is hereby corrected as shown below:

Column 1,
Line 28, change "frame" to -- the flame --.

Column 6,
Line 1, change "eyery" to -- every --.

Column 11,
Line 2, change "hither" -- higher --.

Signed and Sealed this

Sixteenth Day of October, 2001

Attest:

NICHOLAS P. GODICI
*Acting Director of the United States Patent and Trademark Office*

*Attesting Officer*